L. FONNESBECK.
AGRICULTURAL IMPLEMENT.
APPLICATION FILED JULY 11, 1916.
1,225,423. Patented May 8, 1917.
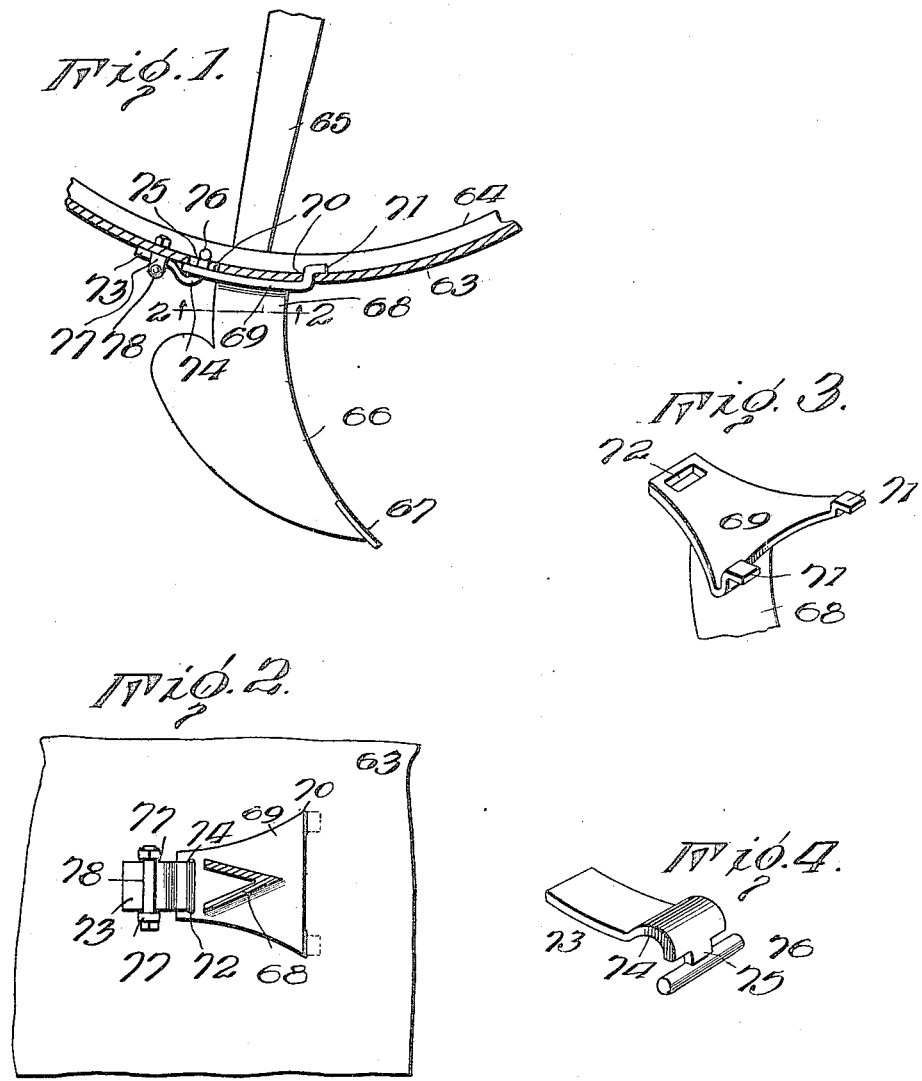
Inventor
L. Fonnesbeck
By
[signature], Attorneys.

UNITED STATES PATENT OFFICE.

LEON FONNESBECK, OF LOGAN, UTAH.

AGRICULTURAL IMPLEMENT.

1,225,423.  Specification of Letters Patent.  Patented May 8, 1917.

Original application filed April 6, 1916, Serial No. 89,415. Divided and this application filed July 11, 1916. Serial No. 108,676.

*To all whom it may concern:*

Be it known that I, LEON FONNESBECK, a citizen of the United States, residing at Logan, in the county of Cache and State of Utah, have invented certain new and useful Improvements in Agricultural Implements, of which the following is a specification.

This application is a division of an application for patent on motor plows, Serial No. 89,415, filed by me April 6, 1916.

The present invention relates particularly to the ground-engaging implement or rotary tool and seeks to provide a novel construction of rotary plow or tool whereby the earth-engaging members will be securely supported.

The invention is illustrated in the accompanying drawings, in which,

Figure 1 is a view showing a portion of a cylinder in section and a plow share secured thereto in elevation;

Fig. 2 is a section on the line 2—2 of Fig. 1;

Fig. 3 is a detail perspective view of the attaching plate or cap on the tool;

Fig. 4 is a detail perspective view of the latch or locking plate.

In the drawings, 63 designates a portion of a cylinder or drum which is reinforced by internal annular bands 64 and carried by spokes 65 upon a central shaft or axle. Motion is imparted to this drum or cylinder so that it rotates in the same direction as the ground wheels of the machine upon which it is mounted but at a higher speed. The ground-engaging tools or members 66, in the present instance, are shown as of the same form as the ordinary turning plow now in common use but, of course, are much smaller and are provided in such numbers as to approximately cover the entire surface of the drum 63. It is to be understood, however, that other forms of implements may be used and that the points 67 may be of any desired shape. The standard or shank 68 of the ground-engaging member is substantially triangular at its attaching end and is formed or provided with a cap or attaching plate 69 of similar form which is dished slightly to conform to the periphery of the drum 63 to which it is secured. The drum is provided with slots or openings 70 through its periphery to receive the attaching devices by which the plate 69 is secured and these slots are so arranged that the plows will be in staggered relation around the drum and, consequently, in operation will thoroughly turn over and pulverize the soil. The edge of the cap which is the base of the triangle is disposed at the rear, relative to the direction of travel of the machine, when the attached plow is in its lowest position. At the corners of this basal edge, the cap is provided with offset lugs or hook-like projections 71 which are inserted through spaced slots 70 in the drum while the plow lies close to the periphery of the drum after which the plow is swung to a position approximately radial to the drum thereby causing the retaining lugs or projections 71 to engage the inner surface of the drum, as shown in Fig. 1. At its apex, the cap is provided with a slot 72 which is adapted to register with a slot 70 in the drum and receive a locking lever or latch 73 which is inserted through said slot and the registering slot in the drum from the interior of the drum and is then swung over and beyond the cap to be fastened to the drum. This latching lever is constructed with an arched portion 74 whereby the lever may clear the apex of the cap and lie close against the surface of the drum. From the inner end of the arched portion, a neck 75 extends to carry a head or cross bar 76, the length of which is greater than the width of the lever so that it may project over the slot through which the lever is inserted and engage the inner surface of the drum to prevent withdrawal of the latch. The dimensions of the neck 75 should be such that, when the latch is in place, it may be rocked about the head 76 to engage the slot 72 and assume the position shown in Fig. 1 and loss of the latch will be prevented, when the plow is removed, by the shoulders at the outer end of the neck engaging the outer surface of the drum and the head engaging the inner surface thereof. The latch is inserted through the slot 70 until the neck is wholly within the slot whereupon the latch is rotated through an arc of ninety degrees about its own longitudinal axis thereby causing the shoulders and the head to project beyond the sides of the slot. The outer end of the lever fits against the drum between lugs or ears 77 thereon and a pin or bolt 78 is inserted through said lugs or ears over the end of the latch to retain the same in the locking position.

Having thus described the invention, what is claimed as new is:

1. In a rotary plow, the combination of a drum provided with slots disposed in triangular relation, a plow, a triangular cap plate at the upper end of the plow provided at one edge with projections passing through two of the slots in the drum and engaging the inner surface of the same, the cap plate being provided at the corner remote from said projections with a slot registering with a slot in the drum, a latch inserted through said registering slots, said latch having a neck to pass through said slots and a head at the inner end of said neck to bear against the inner side of the drum and permit rocking of the latch, the latch being further constructed with an arched portion to clear the edge of the cap plate and permit its extremity to lie close against the drum, projections on the drum at the sides of the latch, and a securing device inserted through said projections and passing over the latch.

2. In a rotary plow, the combination of a drum, a plow, a cap plate on said plow having means at one end to enter the drum and engage the inner face thereof, and means at the opposite end of the cap plate for locking the same to the drum.

3. In a rotary plow, the combination of a drum, a plow, a cap plate at the upper end of the plow having a slot at one end, projections at the opposite end of the cap plate extending into the drum and engaging the inner side of the same, a latch inserted outwardly through the drum and the slot in the cap plate and turned over against the drum, and a retaining device secured upon the drum and extending over the end of the latch.

In testimony whereof I affix my signature.

LEON FONNESBECK. [L. S.]

Copies of this patent may be obtained for five cents each, by addressing the "Commissioner of Patents, Washington, D. C."